United States Patent [19]

Glaser

[11] Patent Number: 5,471,883
[45] Date of Patent: Dec. 5, 1995

[54] COOLED PRESSURE SENSOR

[75] Inventor: Josef Glaser, Graz, Austria

[73] Assignee: AVL Gesellschaft fur Verbrennungskraftmaschinen und Messtechnik mbH, Graz, Austria

[21] Appl. No.: 250,826

[22] Filed: May 31, 1994

[30] Foreign Application Priority Data

Jun. 1, 1993 [AT] Austria ................... 1060/93

[51] Int. Cl.$^6$ ................... G01L 7/00
[52] U.S. Cl. ................ 73/708; 73/756; 165/104.19
[58] Field of Search ............... 73/756, 708; 165/104.19, 165/104.26

[56] References Cited

U.S. PATENT DOCUMENTS

| | | | |
|---|---|---|---|
| 3,349,623 | 10/1967 | Pastan | 73/726 |
| 3,678,753 | 7/1972 | Eggleston et al. | 73/726 |
| 4,169,387 | 10/1979 | Krempl | 73/708 |
| 4,369,659 | 1/1983 | Wareham | 73/708 |
| 4,485,670 | 12/1984 | Camarda et al. | 73/708 |
| 4,783,994 | 11/1988 | Ashby, Jr. | 73/147 |
| 4,815,368 | 3/1989 | Nelles | 99/452 |
| 5,036,797 | 8/1991 | Koozer | 119/21 |
| 5,069,043 | 12/1991 | Wachs et al. | 62/305 |

FOREIGN PATENT DOCUMENTS 261934  5/1968  Austria.

*Primary Examiner*—Hezron E. Williams
*Assistant Examiner*—George M. Dombroske
*Attorney, Agent, or Firm*—Watson, Cole, Grindle & Watson

[57] ABSTRACT

A cooled pressure sensor includes a first housing part with inlet and outlet pipes for a cooling medium and a second housing part sealed gas-tight by means of a membrane and containing a signal generating element for force or displacement sensing. Several cooling channels are located in the wall of the second housing part, the coding channel being at least indirectly connected to the inlet and outlet pipes and positioned around the signal generating element to be cooled and/or are directed towards the membrane subject to high thermal loads to achieve better cooling performance.

8 Claims, 3 Drawing Sheets

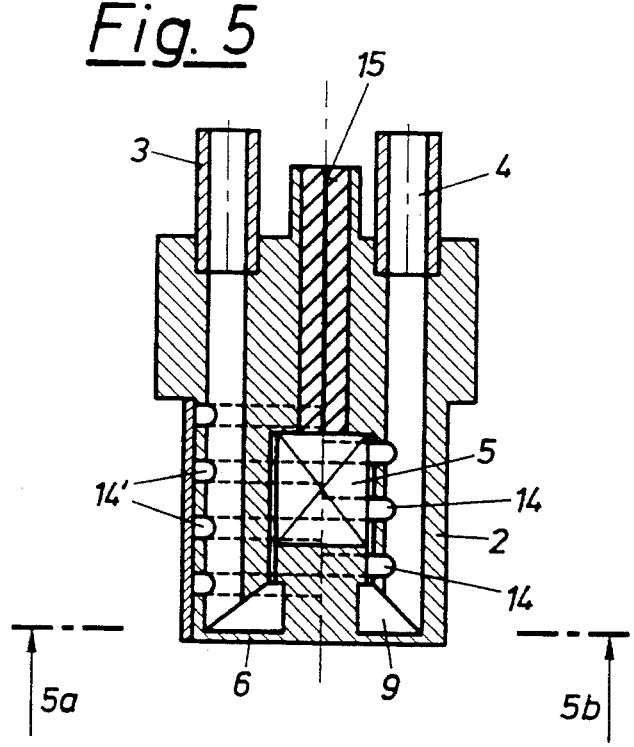
Fig. 5
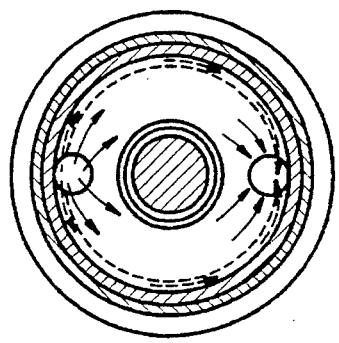
Fig. 5a
Fig. 5b
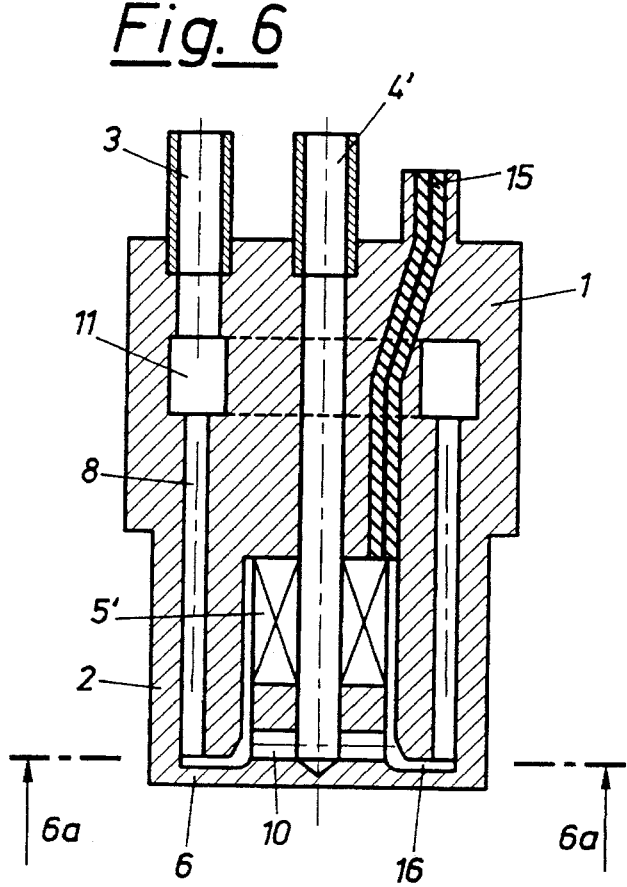
Fig. 6
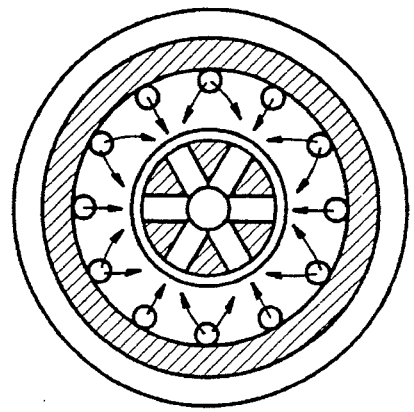
Fig. 6a

COOLED PRESSURE SENSOR

BACKGROUND OF THE INVENTION

The invention relates to a cooled pressure sensor with a first housing part containing inlet and outlet pipes for a cooling medium, and a second housing part sealed gas-tight by means of a membrane and containing a signal-generating element for force or displacement sensing.

Such sensors are used, for example, for pressure measurement in the combustion chamber of internal combustion engines. Such processes are accompanied by very high heat flows into the pressure sensor, which require strong cooling to carry off from the sensor the thermal energy entered by radiation, convection or conduction, while causing large heat deformations of the sensor components. In internal combustion engines the mounting site of the pressure sensor is often subject to strong deformation, exposing the sensor to mechanical stresses frequently surpassing those caused by the measurement pressure.

DESCRIPTION OF THE PRIOR ART

In previous pressure sensors the cooling system essentially comprises a large rotation-symmetrical space between the wall of the housing and the transducer, which extends as far as to a sealing element on the side subject to pressure, i.e., the membrane subject to the pressure to be determined.

In this context a pressure sensor is described in AT-PS 261 934, for instance, which is provided with a signal-generating element in a housing. This element directly rests against the housing by means of a shoulder, and against a membrane welded to the housing. The lower part of the element is surrounded by an annular chamber through which a cooling medium is passed. By means of two diametrically opposed strips, the annular chamber is divided into two identical halves, one of which is connected to an inlet pipe and the other one to an outlet pipe. Furthermore, open passages are provided that extend towards the membrane, connecting the two halves of the annular chamber with each other and carrying the cooling medium.

Although the cooling performance obtained with the known device in the area of the membrane is comparatively good, the flow velocities in the annular chamber around the signal-generating element are relatively small and inhomogeneous, such that the area of the signal-generating element is not sufficiently cooled.

Besides, the mechanical strength of the sensor housing is strongly impaired by the relatively large annular chamber at the end subject to heat and pressure. This will lead to relatively large deformations of the sensor housing as a result of both the temperature-induced stresses at the sensor and the deformations at the mounting site, such that error signals may be generated. The possibility of utilizing a suitable configuration of the cooling chamber to cool certain parts of the sensor more than others, thereby obtaining a uniform temperature, can hardly be realized in this known type of sensor.

SUMMARY OF THE INVENTION

It is an object of the invention to propose a pressure sensor which, in addition to offering a satisfactory rigidity of the housing part facing the pressure medium to be measured, is provided with a cooling system permitting the thermal energy input into the sensor to be carried off effectively.

In the invention this is achieved by providing a number of cooling channels in the wall of the second housing part, which channels are at least indirectly connected to the inlet and outlet pipes, and which are arranged in a cage-like manner around the signal-generating element to be cooled, and/or are directed towards the membrane subject to high thermal loads. In this way a large annular chamber is avoided in the pressure sensor of the invention, which would impair the mechanical strength of the second part of the housing, and a cooling system is formed from a number of cooling channels which surround the sensing or signal-generating element like a cooling cage and are located in the wall of the second part of the housing. The cooling channels may be located where cooling is needed, the number of bores, their position in the housing, and their cross-section and shape permitting the local cooling performance to be chosen as required.

As another advantage the mechanical strength of the housing is hardly impaired. Especially at the front of the pressure sensor the annular chambers adjacent to the membrane may be kept particularly small, or may be omitted altogether in individual variants. In this way sensor deformations and error signals resulting therefrom are minimized.

In further development of the invention it is proposed that first cooling channels be provided which depart from at least one inlet pipe and end in an annular chamber adjacent to the membrane and that second cooling channels be provided, which depart from the annular chamber and end in at least one outlet pipe.

The invention permits in this context that the inlet pipe be connected with a distributor chamber from which the first cooling channels depart, and the second cooling channels open into a collecting chamber which is connected with the outlet pipe, and that the first and second cooling channels be distributed essentially rotation-symmetrically in the wall of the second housing part.

The distributor chamber and the collecting chamber can be provided in the first housing part, which is subject to lesser thermal loads, for instance, as concentric annular chambers, or as annular chambers situated one above the other in axial direction.

According to the invention it is possible that an annular chamber can be provided in the first housing part or in the area of the second housing part facing away from the membrane, which chamber is divided into two partial chambers of approximately the same size by partitions located opposite of each other, one partial chamber being configured as distributor chamber, and the other one as collecting chamber.

A particularly compact design is obtained by positioning the annular chamber at the inner edge of the ring-shaped membrane, and connecting it with the cooling channels running towards the outer edge of the membrane via a narrow annular gap between membrane and housing part, through which the coolant flows in essentially radial direction.

A variant offering excellent control of the cooling performance in the area of the signal-generating element is characterized in that the second housing part is provided with several annular cooling channels in the area of the signal-generating element, which channels surround the signal-generating element and are cut in opposite areas by the inlet and outlet pipes.

A further variant of the invention provides that, departing from an annular distributor chamber in the first housing part, several cooling channels directed towards the outer edge of the membrane be provided, which are connected via a narrow annular gap on the side of the membrane with a central outlet pipe passing through a ring-shaped signal-generating element.

BRIEF DESCRIPTION OF THE DRAWINGS

The invention will be further described with reference to the accompanying drawings, in which FIGS. 3a, 4a, 4b, 5a, 5b, 6a are the corresponding radial sections.

DETAILED DESCRIPTION OF PREFERRED EMBODIMENTS

Figure 1:
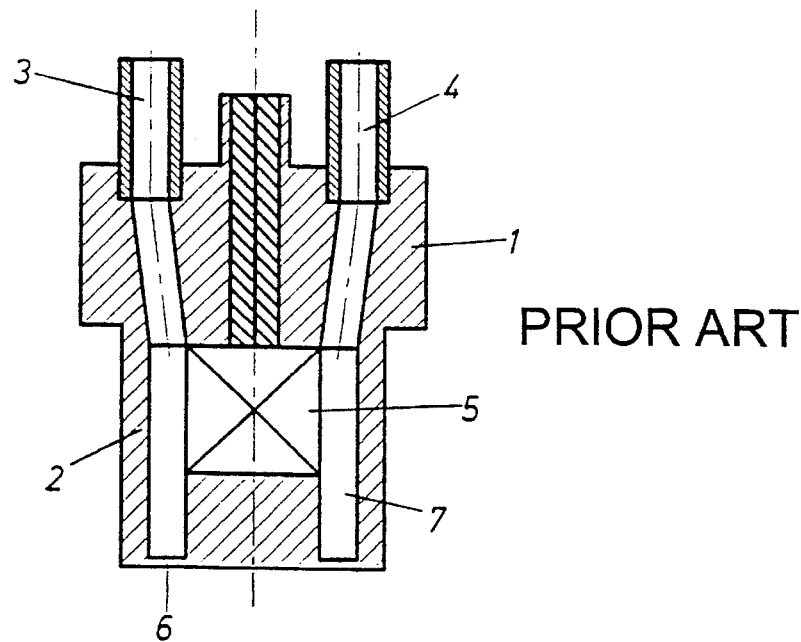
FIG. 1 is a longitudinal section of a cooled pressure sensor according to the state of the art.

The state-of-the-art pressure sensor shown in FIG. 1, which is reduced to its main components, comprises a first housing part 1 and a second housing part 2, the two parts being provided in one piece. The first housing part 1 contains inlet and outlet passages 3 and 4 for feeding and draining a coolant, while the second housing part 2, which may be inserted into a measurement bore, contains a force or displacement-sensing signal-generating element 5, and is sealed gas-tight by a membrane 6. For cooling of the signal-generating element 5 and the membrane 6, an annular cooling chamber 7 is provided in the housing part 2, which chamber 7 is flow-connected with the inlet and outlet passages 3 and 4, and extends to the membrane 6. This type of pressure sensor has certain disadvantages which have been discussed previously.

In all variants of the invention, which are presented in FIGS. 2 to 6, the large annular cooling chamber 7 reaching from the signal-generating element 5 to the membrane 6 is replaced by a number of cooling channels 8, 10, 14, 14', which are located in the wall of the housing part 2, surrounding the signal-generating element 5 to be cooled in a cage-like manner, and which are partly directed against the membrane 6 subject to high thermal loads.

Figure 2:
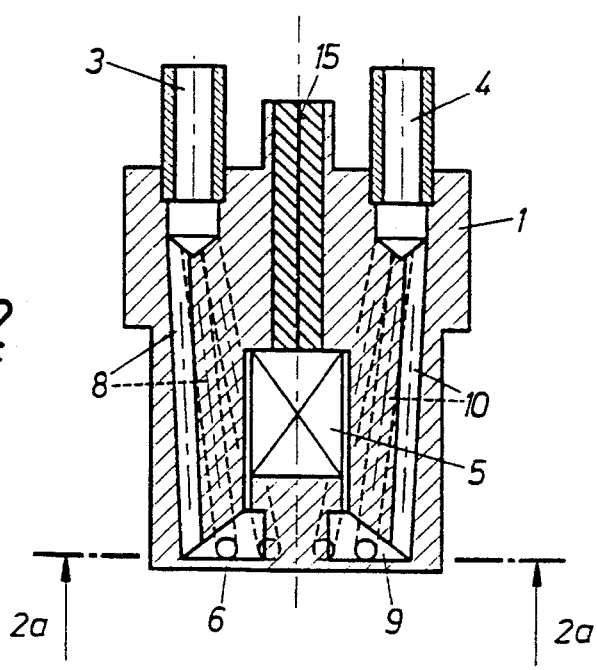
FIG. 2 is a longitudinal section of a first variant of a pressure sensor according to the invention.
Figure 2A:
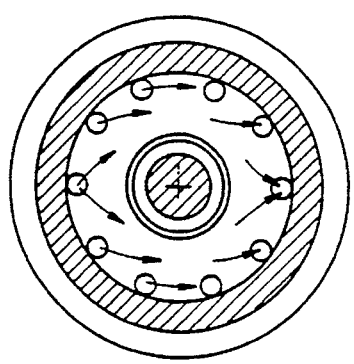
FIG. 2a is a radial section of the pressure sensor along line 2a—2a, FIGS. 3–6 are longitudinal sections of other variants of the invention.

In the variant of FIGS. 2 and 2a, for instance, first cooling channels 8 depart from the inlet pipe 3 and open into a small annular chamber 9 adjacent to the membrane 6. Second cooling channels 10 run from the annular chamber 9 towards the outlet pipe 4. Due to the cooling channels 8 and 10 in housing part 2, the thermal energy input in this area is efficiently drained, while an optimum flow distribution is obtained towards the membrane 6.

Figure 3:
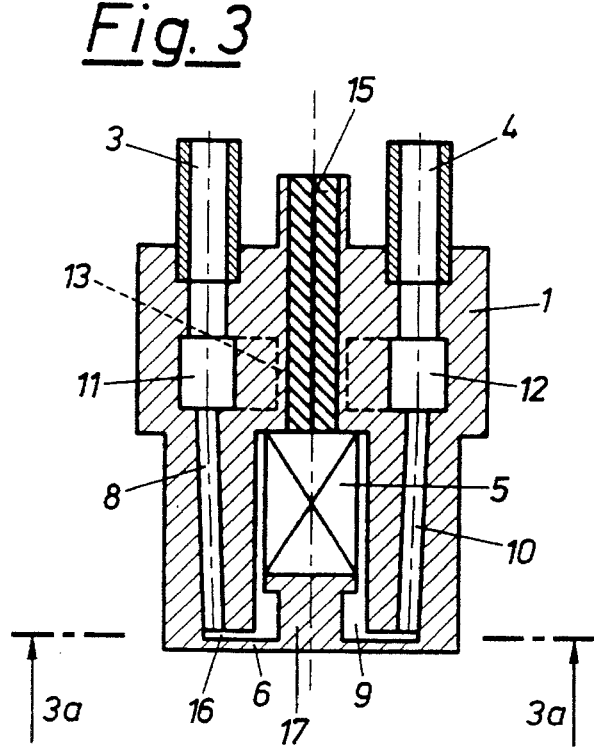

FIGS. 3, 3a, and 4, 4a, 4b show similar variants, where first and second cooling channels 8 and 10 are provided in housing part 1, which run from a distributor chamber 11 fed by the inlet pipe 3, via an annular chamber 9 in the area of the membrane 6 into a collecting chamber 12 connected with the outlet pipe 4. In the variant of FIG. 3 the distributor chamber 11 and the collecting chamber 12 are formed by an annular chamber in housing part 1, which is divided into two partial chambers of approximately the same size by partitions 13 located opposite of each other.

Figure 3A:
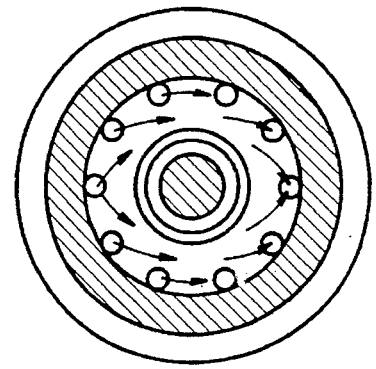

A special feature of the variant of FIGS. 3, 3a is the way in which the coolant is guided in the area of the membrane 6. Departing from the first cooling channels 8, which lead towards the outer edge of the membrane 6, the coolant flows in essentially radial direction through a narrow annular gap 16 into an annular chamber 9, which may be created by reducing the diameter of the pressure-transmitting part 17 in front of the signal-generating element 5. In the annular chamber 9 the coolant flows to the other side of the sensor, and from there towards the second cooling channels 10, again essentially radially through the annular gap 16. Due to the small height of the annular gap 16 the rigidity of the housing is much higher than in conventional configurations.

Figure 4:
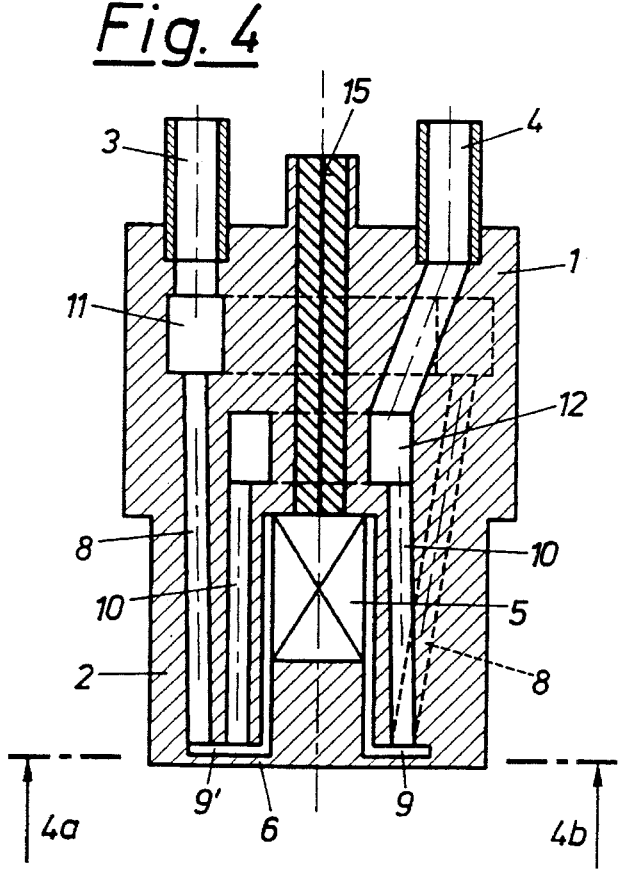
Figure 4A:
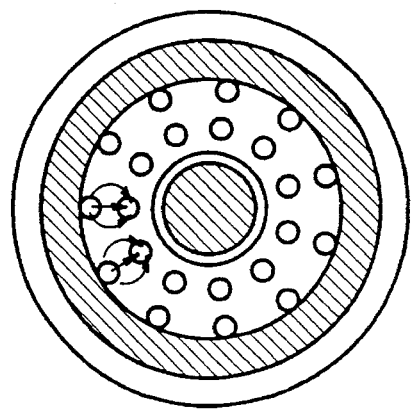

In the variant shown in FIG. 4 the first and second cooling channels 8 and 10 each are connected to a separate annular chamber in the housing part 1, one acting as distributor chamber 11 (interrupted in the area of outlet pipe 4), and one as collecting chamber 12. Due to this configuration the first and second cooling channels 8 and 10 may be arranged rotation-symmetrically, permitting a rotation-symmetrical temperature distribution in the sensor. Again, the cross-section of the annular chamber 9 may be kept exceptionally small, as it will only have to admit the coolant stream from one cooling channel.

Figure 4B:
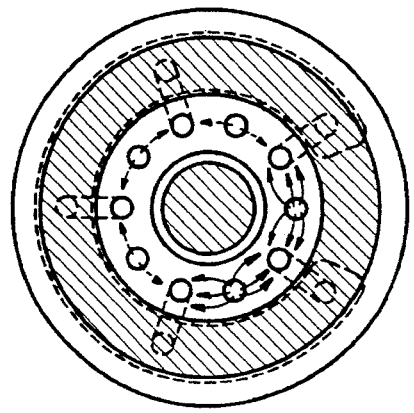

If the cooling channels 8 and 10 in the area of the membrane 6 are connected by bores or grooves 9' (see left half of FIGS. 4, and 4a), the annular chamber 9 next to the membrane 6 could be eliminated in this variant. All that is required in this instance is a small gap between membrane 6 and housing part 2 in order to accommodate the minute membrane movements amounting to not more than a few micrometers. The right half of FIGS. 4 and 4b show a further variant, where the cooling channels 8 and 10 are located one behind the other along the circumference.

The variant of FIGS. 5 and 5b represents a pressure sensor whose signal-generating element 5 is surrounded in a cage-like manner by annular cooling channels 14 located in housing part 2, which channels 14 are cut by the inlet and outlet pipes 3, 4 in opposite areas and are thus integrated into the cooling circuit. As is shown in the left half of FIG. 5 (see also FIG. 5a), it would also be possible to locate annular cooling channels 14' (also in conjunction with cooling channels 14) close to the outer surface of housing part 2. Once more an annular chamber 9 is provided in the vicinity of membrane 6, which chamber 9 is flow-connected to the inlet and outlet pipes.

FIG. 6 finally shows a variant of the pressure sensor in which several cooling channels 8 are provided which depart from an annular distributor chamber 11 in housing part 1, and are directed towards the outer edge of the membrane 6, and which end in a narrow annular gap 16 next to the membrane 6. The coolant is drained through a central outlet pipe 4' passing through a ring-shaped signal-generating element 5'. Electrically insulated signal leads for the element 5 or 5' have the reference number 15 in the individual variants.

I claim:

1. A cooled pressure sensor with a first housing part containing separate inlet and outlet pipes for a cooling medium, and a second housing part sealed gas-tight by means of a membrane and containing a signal-generating sensor element, wherein a plurality of cooling channel means are provided in a wall of said second housing part surrounding said signal-generating sensor element, said cooling channel means extending in a cage-like manner around said signal-generating element and being in communication with said inlet and outlet pipes for conveying cooling medium supplied by said inlet pipe around said signal-generating sensor element to cool said signal-generating sensor element and to said outlet pipe for discharge.

2. A pressure sensor according to claim 1, wherein said cooling channel means extend towards said membrane subject to high thermal loads.

3. A pressure sensor according to claim 2, wherein first of said cooling channel means are connected to said inlet pipe end and extend to an annular chamber adjacent to said membrane, and wherein second of said cooling channel means are connected to said annular chamber and extend to said outlet pipe.

4. A pressure sensor according to claim 3, comprising a ring-shaped membrane with an inner and an outer circumference, wherein said annular chamber is located close to said inner circumference of said ring-shaped membrane and is connected with said cooling channel means extending towards said outer circumference of said membrane via a narrow annular gap between said membrane and said second housing part, through which said cooling medium flows in essentially radial direction.

5. A pressure sensor according to claim 2, wherein said inlet pipe is connected with a distributor chamber from which first of said cooling channel means depart, and wherein second of said cooling channel means open into a collecting chamber which is connected with said outlet pipe, and wherein said first and second cooling channel means are distributed essentially rotation-symmetrically in said wall of said second housing part.

6. A pressure sensor according to claim 5, wherein an annular chamber is provided in said first housing part, said chamber being divided into first and second partial chambers of approximately the same size by partitions located opposite each other, said first partial chamber being configured as said distributor chamber and said second partial chamber as said collecting chamber.

7. A pressure sensor according to claim 2, comprising a ring-shaped membrane with an inner and an outer circumference, wherein said cooling channel means departing from an annular distributor chamber in said first housing part are directed towards said outer circumference of said membrane and are connected via a narrow annular gap between said membrane and said second housing part with a central outlet pipe passing through a ring-shaped signal-generating element.

8. A pressure sensor according to claim 1, wherein said second housing part is provided with several annular cooling channel means in the area of said signal-generating element, which channel means surround said signal-generating element and are cut in opposite areas by said inlet and outlet pipes.

* * * * *

UNITED STATES PATENT AND TRADEMARK OFFICE
CERTIFICATE OF CORRECTION

PATENT NO. : 5,471,883
DATED : December 5, 1995
INVENTOR(S) : Josef Glaser

It is certified that error appears in the above-indentified patent and that said Letters Patent is hereby corrected as shown below:

On title page, item

[73]    Assignee:    AVL GESELLSCHAFT FUR VERBRENNUNGSKRAFTMASCHINEN UND MESSTECHNIK MBH PROF.DR.DR.H.C. HANS LIST Signed and Sealed this Twenty-eighth Day of May, 1996

Attest:

BRUCE LEHMAN

*Attesting Officer*    *Commissioner of Patents and Trademarks*